(12) United States Patent
Mano

(10) Patent No.: US 11,040,649 B2
(45) Date of Patent: Jun. 22, 2021

(54) VEHICULAR SENSOR AND VEHICLE PROVIDED WITH SAME

(71) Applicant: KOITO MANUFACTURING CO., LTD., Tokyo (JP)

(72) Inventor: Mitsuharu Mano, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 371 days.

(21) Appl. No.: 16/063,795

(22) PCT Filed: Dec. 1, 2016

(86) PCT No.: PCT/JP2016/085812
§ 371 (c)(1),
(2) Date: Jun. 19, 2018

(87) PCT Pub. No.: WO2017/110415
PCT Pub. Date: Jun. 29, 2017

(65) Prior Publication Data
US 2020/0271786 A1   Aug. 27, 2020

(30) Foreign Application Priority Data

Dec. 21, 2015 (JP) .............................. JP2015-248824

(51) Int. Cl.
*G01S 17/00* (2020.01)
*B60Q 1/00* (2006.01)
*G01S 17/931* (2020.01)
*G01S 17/18* (2020.01)
(Continued)

(52) U.S. Cl.
CPC ............ *B60Q 1/0023* (2013.01); *G01S 17/18* (2020.01); *G01S 17/87* (2013.01); *G01S 17/89* (2013.01); *G01S 17/931* (2020.01)

(58) Field of Classification Search
USPC ........................................................ 356/5.01
See application file for complete search history.

(56) References Cited

U.S. PATENT DOCUMENTS 9,069,080 B2 *  6/2015  Stettner .................. G01S 17/86
9,110,169 B2 *  8/2015  Stettner ................ B60G 17/019
9,723,233 B2 *  8/2017  Grauer ............. H01L 27/14643
(Continued)

FOREIGN PATENT DOCUMENTS

DE   10 2012 207 328 A1   11/2013
EP        2 806 288 A1   11/2014
(Continued)

OTHER PUBLICATIONS

Search Report dated Mar. 14, 2017, issued by the International Searching Authority in counterpart International Patent Application No. PCT/JP2016/085812 (PCT/ISA/210).
(Continued)

*Primary Examiner* — James R Hulka
(74) *Attorney, Agent, or Firm* — Sughrue Mion, PLLC

(57) ABSTRACT

A vehicle sensor includes a first light source for short-distance irradiation and a first camera for short-distance imaging mounted on one headlamp of a pair of left and right headlamps provided in a vehicle, and a second light source for long-distance irradiation and a second camera for long-distance imaging mounted on the other headlamp of the pair of left and right headlamps.

8 Claims, 7 Drawing Sheets

(51) Int. Cl.
*G01S 17/87* (2020.01)
*G01S 17/89* (2020.01)

(56) References Cited

U.S. PATENT DOCUMENTS

| | | | | |
|---|---|---|---|---|
| 9,810,785 | B2* | 11/2017 | Grauer | G01S 7/4802 |
| 9,834,209 | B2* | 12/2017 | Stettner | G01S 7/489 |
| 10,377,373 | B2* | 8/2019 | Stettner | G01S 7/4813 |
| 10,408,922 | B2* | 9/2019 | Dahlmann | G01S 17/89 |
| 10,668,855 | B2* | 6/2020 | Kinoshita | B60R 21/00 |
| 2013/0188022 | A1 | 7/2013 | Katz et al. | |
| 2014/0350836 | A1* | 11/2014 | Stettner | G01S 17/931 |
| | | | | 701/301 |
| 2015/0160340 | A1 | 6/2015 | Grauer et al. | |
| 2015/0202939 | A1* | 7/2015 | Stettner | G01S 17/86 |
| | | | | 701/37 |
| 2015/0258990 | A1* | 9/2015 | Stettner | B62D 15/0265 |
| | | | | 701/37 |
| 2016/0344965 | A1* | 11/2016 | Grauer | H04N 5/35536 |
| 2017/0212220 | A1* | 7/2017 | Dahlmann | H04N 13/239 |
| 2018/0056993 | A1* | 3/2018 | Stettner | B60T 7/22 |
| 2019/0025432 | A1* | 1/2019 | Mano | G01S 17/89 |
| 2019/0322272 | A1* | 10/2019 | Stettner | G01S 7/481 |

FOREIGN PATENT DOCUMENTS

| | | |
|---|---|---|
| JP | 59-198377 A | 11/1984 |
| JP | 5-11050 A | 1/1993 |
| JP | 6-242224 A | 9/1994 |
| JP | 2010-61304 A | 3/2010 |
| JP | 2012-180051 A | 9/2012 |
| JP | 2015-510586 A | 4/2015 |

OTHER PUBLICATIONS

Written Opinion dated Mar. 14, 2017, issued by the International Searching Authority in counterpart International Patent Application No. PCT/JP2016/085812 (PCT/ISA/237).

Communication dated Jul. 22, 2019, issued by the European Patent Office in counterpart European Application No. 16878308.2.

* cited by examiner

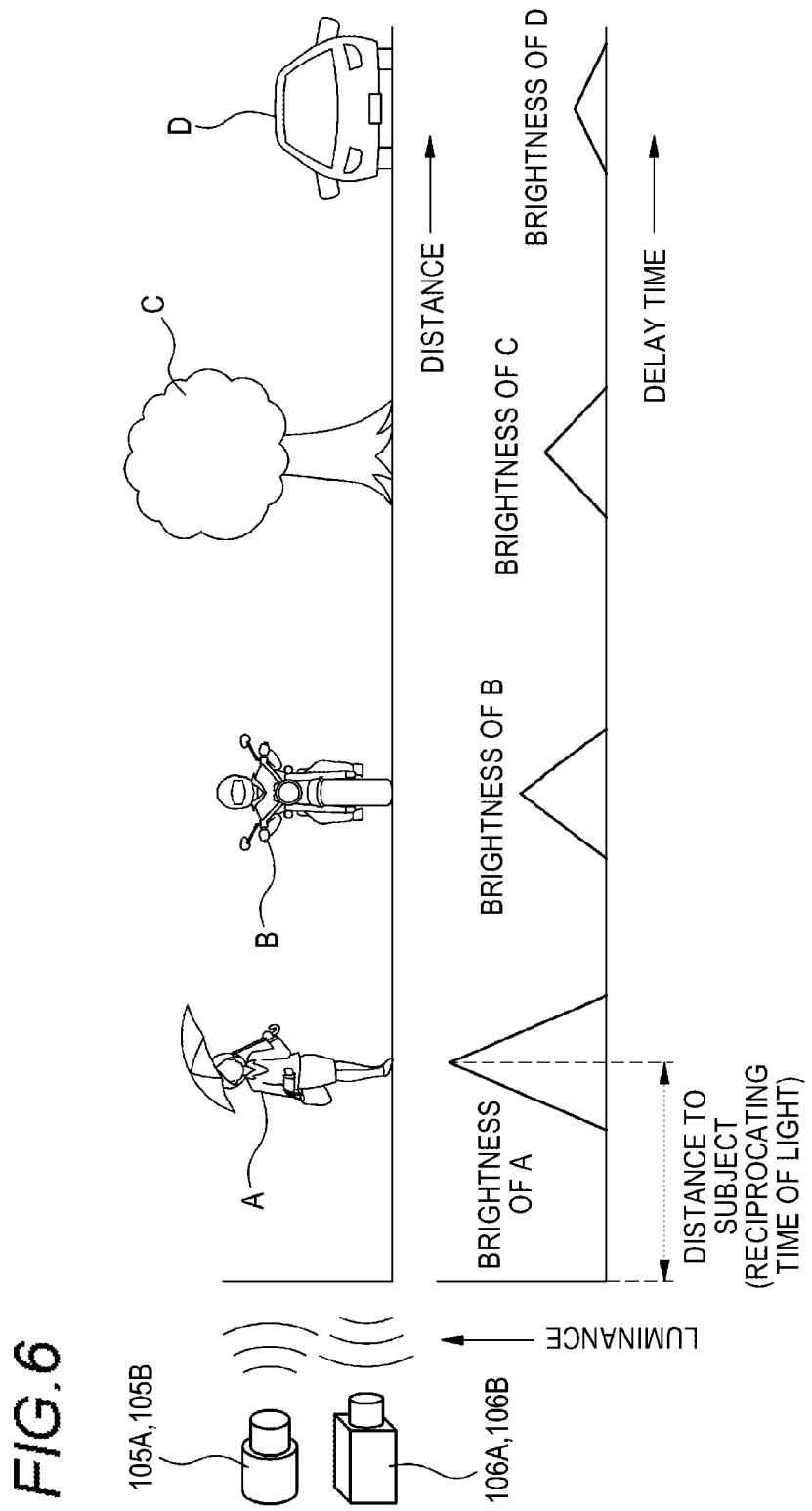

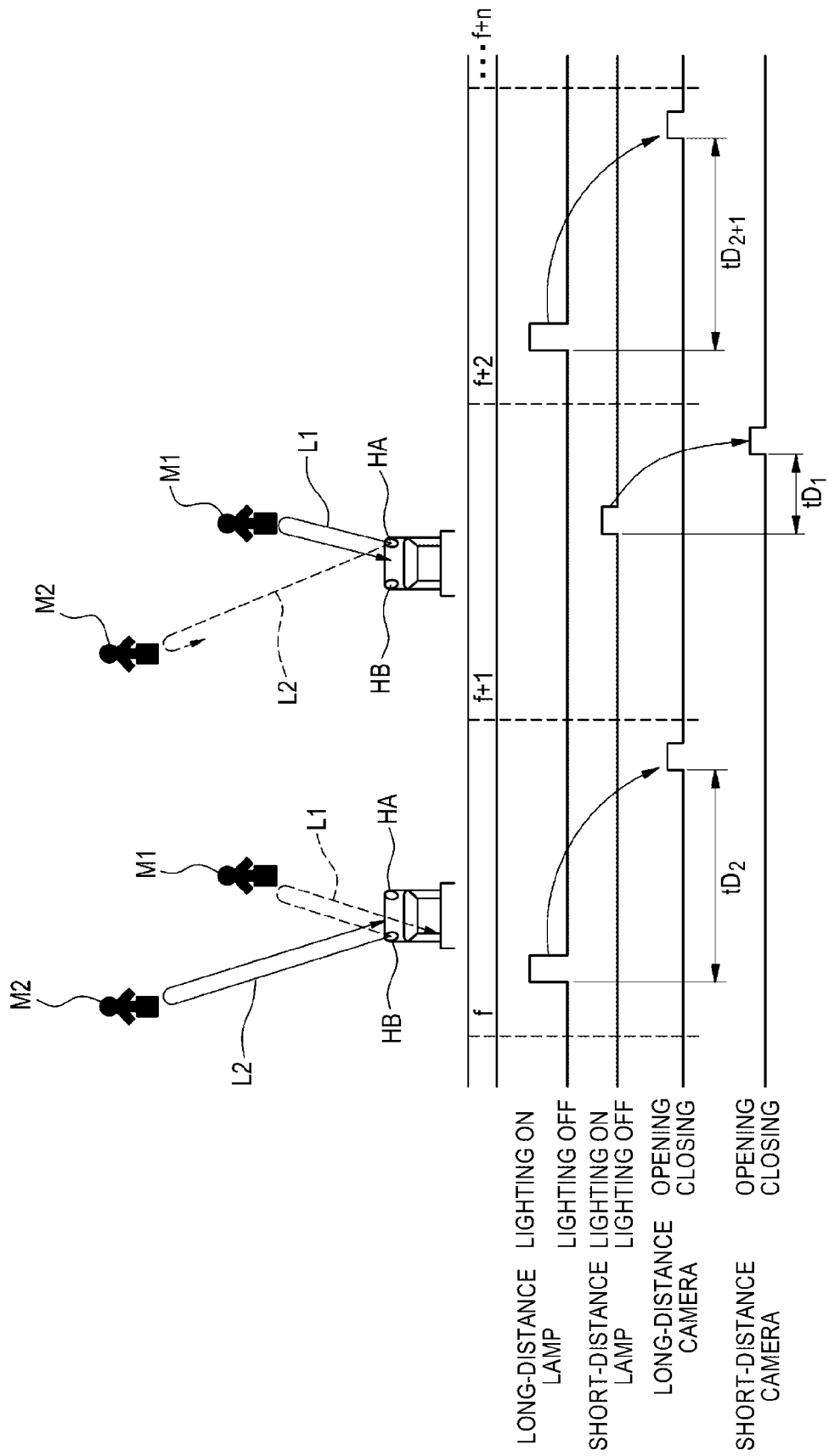

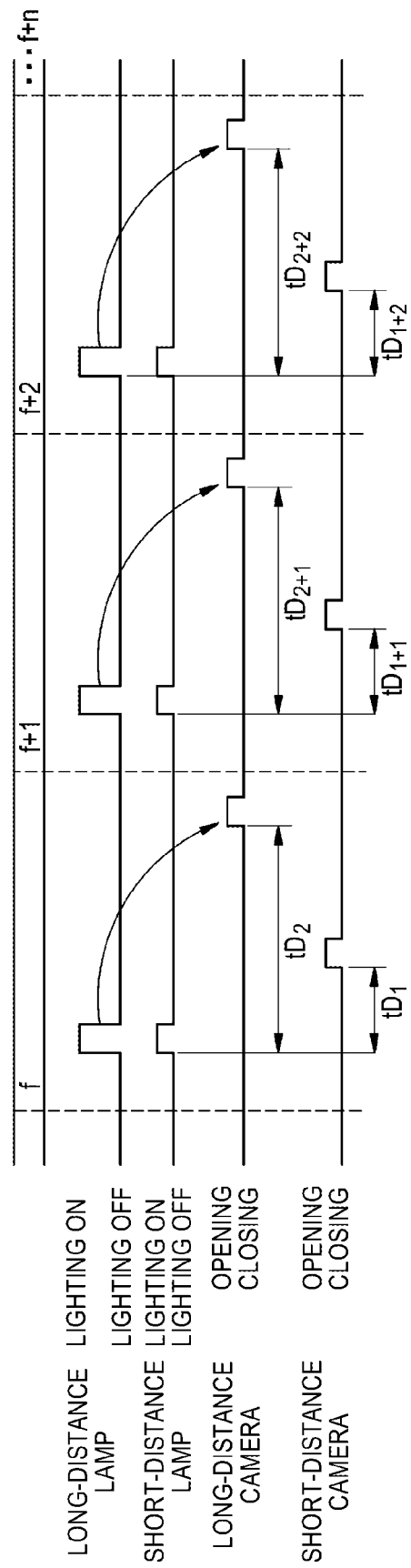

VEHICULAR SENSOR AND VEHICLE PROVIDED WITH SAME

TECHNICAL FIELD

The disclosure relates to a vehicle sensor and a vehicle including the same.

BACKGROUND ART

For example, Patent Document 1 discloses a vehicle headlamp control system (so-called ADB (Adaptive Driving Beam) system) for reducing a glare to a driver of a forward vehicle by detecting the existence of a forward vehicle such as an oncoming vehicle and a preceding vehicle by a recognition camera disposed on a glass surface or the like behind a rearview mirror of a host vehicle and controlling the light distribution of a headlamp so as not to irradiate an area of the forward vehicle.

CITATION LIST

Patent Document

Patent Document 1: Japanese Patent Laid-Open Publication No. 2012-180051

DISCLOSURE OF INVENTION

Problems to be Solved by Invention

In the system as described in Patent Document 1, since the mounting positions of a recognition camera and left and right headlamps are different from each other, the optical axis deviation occurs, and there is a possibility that an error occurs between the position of a forward vehicle detected by a recognition camera and the position where light should not be irradiated in the light distribution control of the headlamp. Therefore, it is not possible to reduce the range (forward vehicle area) in which light is not irradiated. Further, when trying to obtain highly accurate detection performance over a wide range from a near place to a far place with respect to a single recognition camera, the structure of a camera lens becomes complicated and the costs increase.

The disclosure aims to provide a vehicle sensor capable of achieving highly accurate detection performance over a wide range from a near place to a far place of a host vehicle at low cost and minimizing the range in which light is not irradiated, and a vehicle including the same.

Means for Solving the Problems

In order to achieve the above object, a vehicle sensor of the disclosure includes a first light source for short-distance irradiation and a first camera for short-distance imaging mounted on one of a pair of left and right headlamps provided in a vehicle; and a second light source for long-distance irradiation and a second camera for long-distance imaging mounted on the other of the pair of left and right headlamps.

According to the above configuration, it is possible to achieve highly accurate detection performance over a wide range from a near place to a far place of a host vehicle and reduce the device costs. Further, since one set of lamp and camera is mounted in each of the headlamps, the optical axis deviation between the light sources and the cameras is minimized. Therefore, in the light distribution control of the headlamps, it is possible to minimize the range which is not irradiated, based on the detection results by the cameras.

An irradiation range in a left and right direction of the first light source may be in a range of ±20° or more but 90° or less around an optical axis of the first light source, and an irradiation range in a left and right direction of the second light source may be in a range of ±5° or more but 10° or less around an optical axis of the second light source.

According to the above configuration, it is possible to capture both of a near range and a far range with high accuracy.

The first camera may capture an irradiation range of the first light source, whereas the second camera may capture an irradiation range of the second light source.

According to the above configuration, a short-distance optical system (first light source and first camera) and a long-distance optical system (second light source and second camera) can be independently controlled, so that it is possible to simplify image processing algorithm.

In the vehicle sensor described above, each of the first light source and the second light source light may emit pulsed light in a predetermined direction, and each of the first camera and the second camera may acquire a plurality of captured images having different target distance areas by capturing reflected light returning from a target distance area at an imaging timing set according to the target distance area.

The vehicle sensor may further include a timing control unit configured to control the light emission period of the pulsed light emitted from the first light source and the second light source and the imaging timing of the first camera and the second camera.

According to the above configuration, it is possible to exhaustively acquire captured images over a wide range from a near place to a far place with a simple configuration.

The timing control unit may control the light emission period so that the light emission of the first light source and the second light source is sequentially switched, and the timing control unit may control the imaging timing so that the shutter of the first camera is opened after the reflection time of reflected light of light emitted from the first light source has elapsed and the shutter of the second camera is opened after the reflection time of reflected light of light emitted from the second light source has elapsed.

According to the above configuration, the light emission/exposure control can be independently performed in a short-distance optical system (first light source and first camera) and a long-distance optical system (second light source and second camera), respectively, so that it is possible to simplify the control process.

The timing control unit may control the light emission period so that the first light source and the second light source emit light simultaneously, and the timing control unit may control the imaging timing so that the shutter of the first camera is opened after the reflection time of reflected light of light emitted from the first light source has elapsed and the shutter of the second camera is opened after the reflection time of reflected light of light emitted from the second light source has elapsed.

According to the above configuration, a wide range of captured images can be acquired in a short time.

In order to achieve the above object, a vehicle of the disclosure includes the vehicle sensor described above.

According to the above configuration, it is possible to enhance the safety in a vehicle equipped with an automatic driving system, for example.

Effects of Invention

According to the disclosure, it is possible to provide the vehicle sensor capable of achieving highly accurate detection performance over a wide range from a near place to a far place of a host vehicle at low cost and minimizing the range in which light is not irradiated, and the vehicle including the same.

BRIEF DESCRIPTION OF DRAWINGS

FIG. 6 is a schematic view showing temporal luminance changes of pixels corresponding to each object;

FIG. 7 is a view showing an image acquisition processing according to a second embodiment; and FIG. 8 is a view showing an image acquisition processing according to another example of the second embodiment.

EMBODIMENT FOR CARRYING OUT INVENTION

Hereinafter, an example of the present embodiment will be described in detail with reference to the drawings.

First Embodiment

Figure 1:
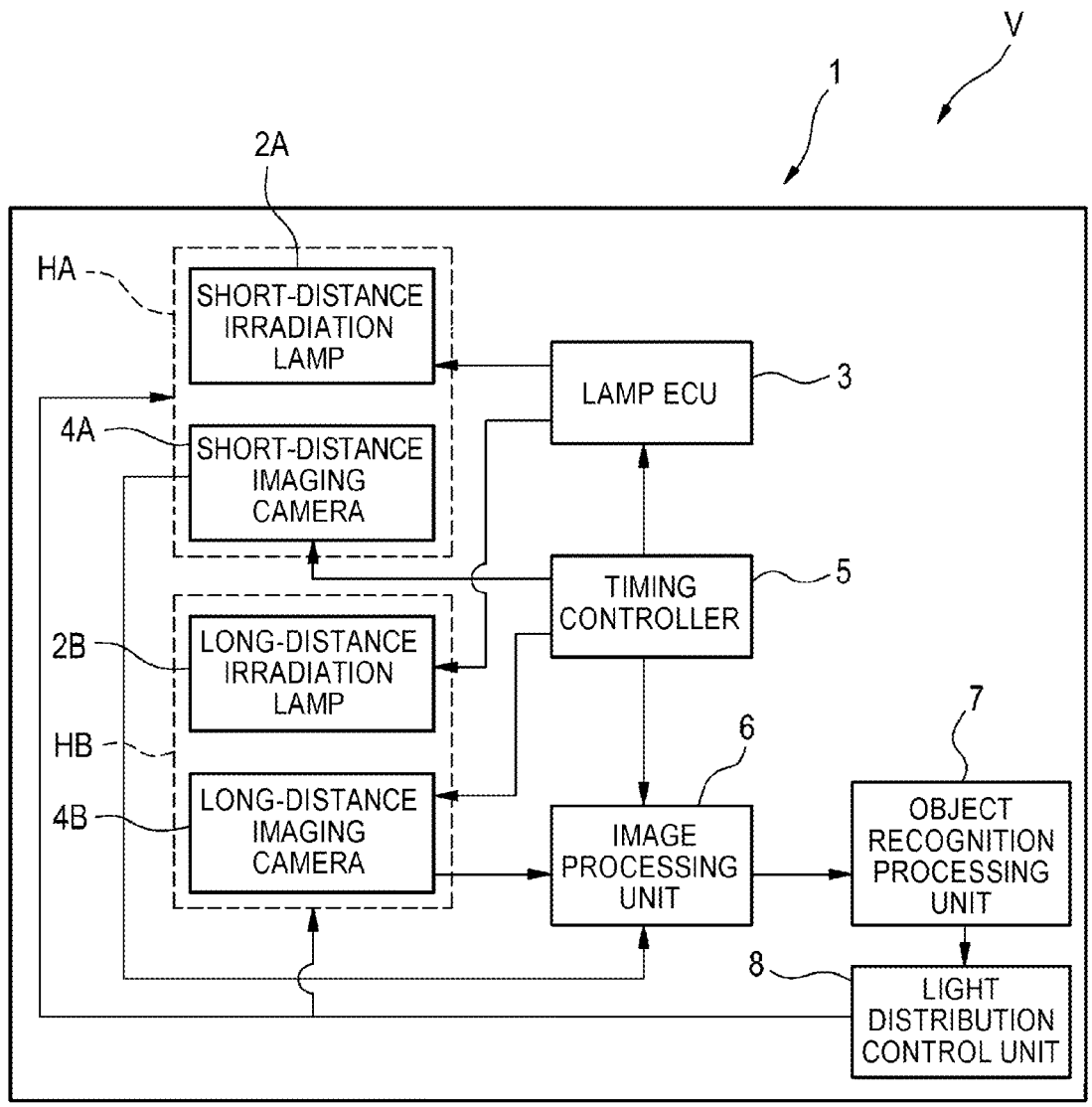
FIG. 1 is a block diagram showing a configuration of a vehicle sensor according to the present embodiment.
Figure 2:
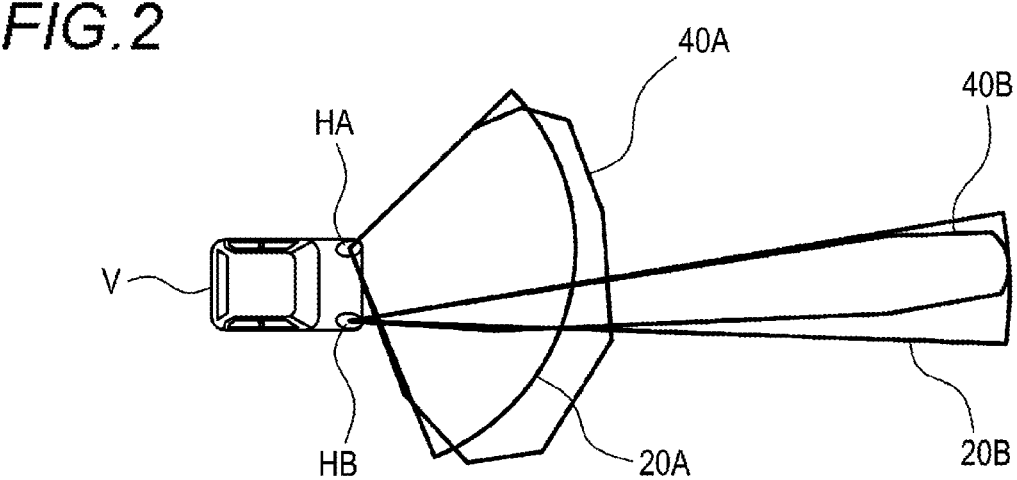
FIG. 2 is a view showing an irradiation range by each lamp included in the vehicle sensor in FIG. 1 and an imaging range by each camera.

FIG. 1 is a block diagram showing a configuration of a vehicle sensor according to a first embodiment of the disclosure. FIG. 2 is a view showing an irradiation range by each lamp included in the vehicle sensor in FIG. 1 and an imaging range by each camera;

As shown in FIG. 1, a vehicle sensor 1 provided in a vehicle V (host vehicle) includes a short-distance irradiation lamp 2A (first light source), a long-distance irradiation lamp 2B (second light source), a lamp ECU 3, a short-distance imaging camera 4A (first camera), a long-distance imaging camera 4B (second camera), a timing controller (timing control unit) 5, an image processing unit 6, an object recognition processing unit 7, and a light distribution control unit 8.

The short-distance irradiation lamp 2A is, for example, a near infrared LED configured to emit light in response to a command signal transmitted from the timing controller 5 via the lamp ECU 3 and is mounted in a right headlamp HA on a front end portion of the vehicle V. As shown in FIG. 2, an irradiation range 20A in a left and right direction of the short-distance irradiation lamp 2A is, for example, in a range of ±20° or more but 90° or less around an optical axis of the short-distance irradiation lamp 2A.

The long-distance irradiation lamp 2B is, for example, a near infrared LED configured to emit light in response to a command signal transmitted from the timing controller 5 via the lamp ECU 3 and is mounted in a left headlamp HB on the front end portion of the vehicle V. As shown in FIG. 2, an irradiation range 20B in a left and right direction of the long-distance irradiation lamp 2B is, for example, in a range of ±±5° or more but 10° or less around an optical axis of the long-distance irradiation lamp 2B.

Meanwhile, although not shown, separately from the short-distance irradiation lamp 2A and the long-distance irradiation lamp 2B, a halogen lamp or an LED lamp or the like as a low-beam irradiation lamp and a high-beam irradiation lamp is mounted in the headlamps HA, HB, respectively.

Further, the short-distance imaging camera 4A captures reflected light of light irradiated from the short-distance irradiation lamp 2A in response to a command signal from the timing controller 5 and outputs the captured image to the image processing unit 6. The short-distance imaging camera 4A is mounted in the right headlamp HA. The short-distance imaging camera 4A can capture reflected light from an imaging range 40A which is substantially the same area as the irradiation range 20A of the short-distance irradiation lamp 2A.

The long-distance imaging camera 4B captures reflected light of light irradiated from the long-distance irradiation lamp 2B in response to a command signal from the timing controller 5 and outputs the captured image to the image processing unit 6. The long-distance imaging camera 4B is mounted in the left headlamp HB. The long-distance imaging camera 4B can capture reflected light from an imaging range 40B which is substantially the same area as the irradiation range 20B of the long-distance irradiation lamp 2B.

The image processing unit 6 outputs captured image data captured by the short-distance imaging camera 4A and the long-distance imaging camera 4B to the object recognition processing unit 7. The object recognition processing unit 7 specifies an object included in the captured image data. A well-known technique such as pattern matching can be used as a method of specifying an object. The light distribution control unit 8 controls the light distribution of the low-beam irradiation lamp and the high-beam irradiation lamp mounted in the headlamps HA, HB depending on the object (person, cars (oncoming vehicle), signs, etc.) specified by the object recognition processing unit 7, for example, so as to irradiate low beam or high beam on the area other than the area where the object is present.

According to the vehicle sensor 1 of the first embodiment described above, the following effects can be obtained.

(1) The vehicle sensor 1 includes the short-distance irradiation lamp 2A and the short-distance imaging camera 4A mounted in the right headlamp HA of the pair of left and right headlamps HA, HB, and the long-distance irradiation lamp 2B and the long-distance imaging camera 4B mounted in the left headlamp HB. According to this configuration, it is possible to achieve highly accurate detection performance over a wide range from a near place to a far place of the vehicle V and reduce the device costs. Further, since one set of lamp and camera is mounted in each of the headlamps HA, HB, the optical axis deviation between the short-distance irradiation lamp 2A and the short-distance imaging camera 4A and the optical axis deviation between the long-distance irradiation lamp 2B and the long-distance imaging camera 4B are minimized. Therefore, for example, in the light distribution control of the headlamps HA, HB in the ADB system, it is possible to minimize the range which is not irradiated by (low-beam irradiation lamp and high-beam irradiation lamp of) the headlamps HA, based on the detection results by each camera 4A, 4B.

(2) In the first embodiment, the short-distance imaging camera 4A can capture the irradiation range 20A of the short-distance irradiation lamp 2A, whereas the long-distance imaging camera 4B can capture the irradiation range 20B of the long-distance irradiation lamp 2B. According to this configuration, a short-distance optical system (the short-distance irradiation lamp 2A and the short-distance imaging camera 4A) and a long-distance optical system (the long-distance irradiation lamp 2B and the long-distance imaging camera 4B) can be independently controlled, so that it is possible to simplify image processing algorithm in the image processing unit 6.

Second Embodiment

Figure 3:
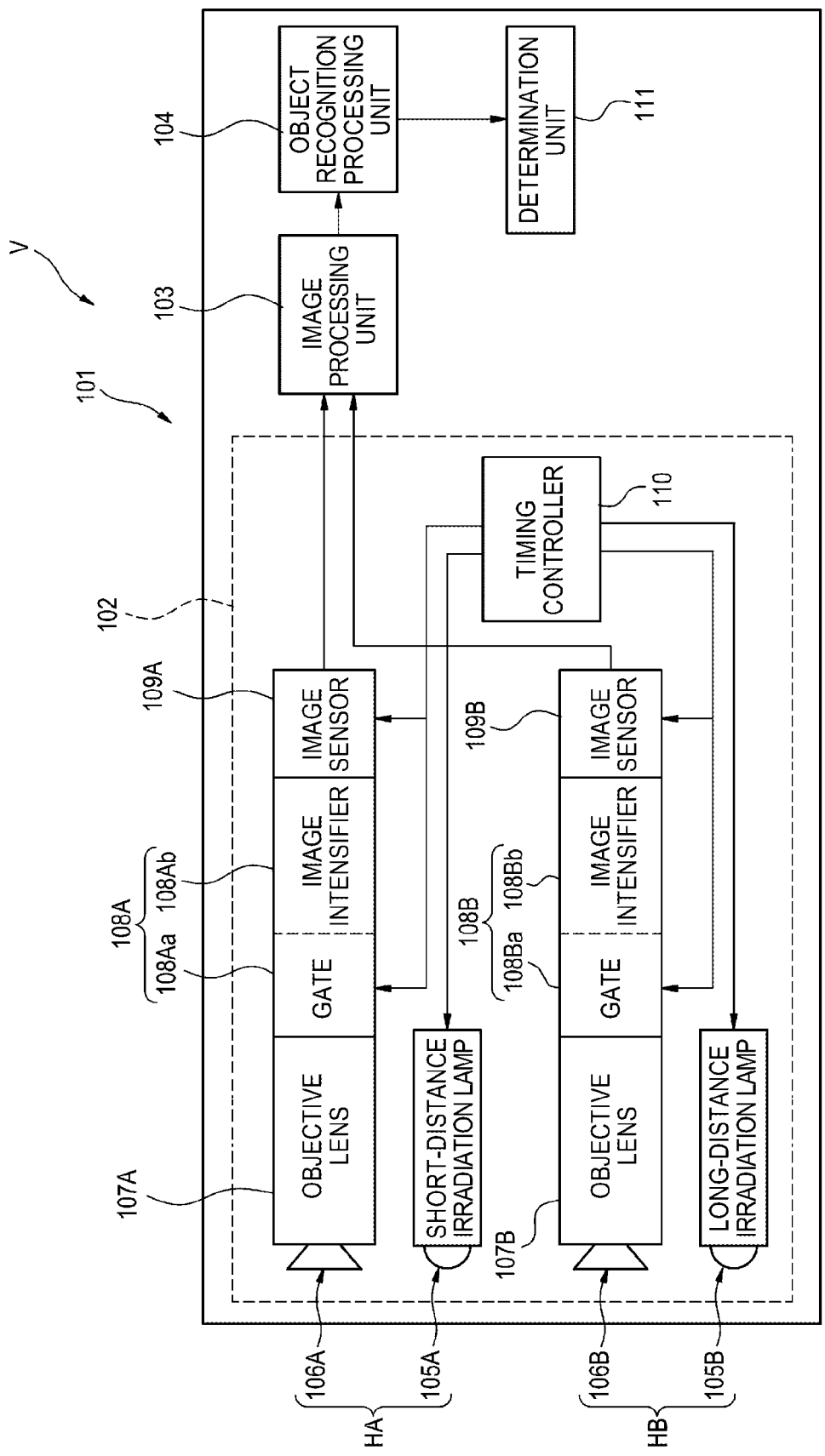
FIG. 3 is a block diagram showing a configuration of a vehicle sensor according to a second embodiment.
Figure 4:
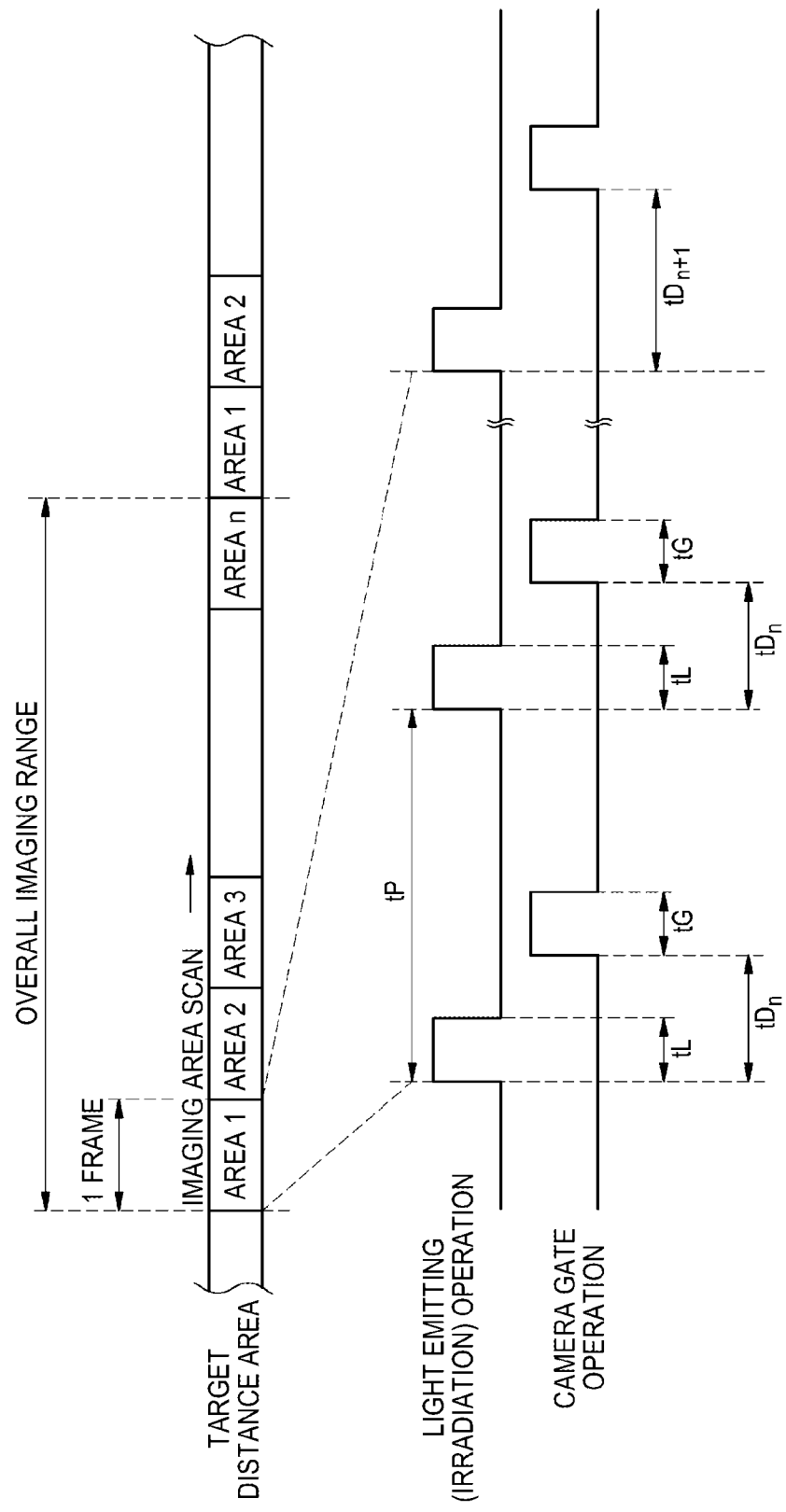
FIG. 4 is a diagram showing a temporal relationship between an operation (light emitting operation) of a light emitting unit and an operation (camera gate operation) of a gate when capturing each target distance area.

FIG. 3 is a block diagram showing a configuration of a vehicle sensor according to a second embodiment of the disclosure. FIG. 4 is a diagram showing a temporal relationship between an operation (light emitting operation) of a light emitting unit and an operation (camera gate operation) of a gate when capturing each target distance area.

As shown in FIG. 3, a vehicle sensor (obstacle detection device) 101 provided in the vehicle V includes an image acquisition device 102, an image processing unit (distance image data generation unit) 103, an object recognition processing unit 104, and a determination unit 111.

The image acquisition device 102 includes a short-distance irradiation lamp 105A, a long-distance irradiation lamp 105B a short-distance imaging camera 106A, a long-distance imaging camera 106B, and a timing controller (timing control unit) 110.

The short-distance irradiation lamp 105A is, for example, a near infrared LED mounted in the right headlamp HA of the vehicle V. As shown in FIG. 4, the short-distance irradiation lamp 105A emits pulsed light in a predetermined direction (e.g., to the front side of the vehicle V) for a predetermined light emission time tL (e.g., 5 ns) in accordance with pulse signal outputted from the timing controller 110. A light emission period tP of the pulsed signal irradiated from the short-distance irradiation lamp 105A has, for example, an interval of 10 μs or less. An irradiation range of the short-distance irradiation lamp 105A is the same range as the short-distance irradiation lamp 2A of the first embodiment shown in FIG. 2.

The long-distance irradiation lamp 105B is, for example, a near infrared LED mounted in the left headlamp HB of the vehicle V. As shown in FIG. 4, the long-distance irradiation lamp 105B emits pulsed light in a predetermined direction (e.g., to the front side of the vehicle V) for a predetermined light emission time tL 5 ns) in accordance with pulse signal outputted from the timing controller 110. A light emission period tP of the pulsed signal irradiated from the long-distance irradiation lamp 105B has, for example, an interval of 10 μs or less. An irradiation range of the long-distance irradiation lamp 105B is the same range as the long-distance irradiation lamp 2B of the first embodiment shown in FIG. 2.

The short-distance imaging camera 106A is a camera mounted in the right headlamp HA of the vehicle V and includes an objective lens 107A, a light multiplier 108A, and an image sensor 109A. Further, the long-distance imaging camera 106B is a camera mounted in the left headlamp HB of the vehicle V and includes an objective lens 107B, a light multiplier 108B, and an image sensor 109B.

The objective lens 107A, 107B are, for example, optical systems set to have an angle of view capable of capturing a predetermined range in front of the vehicle V and receive reflected light from an object. The objective lens 107A has an angle of view capable of capturing the irradiation range of the short-distance irradiation lamp 105A, and the objective lens 107B has an angle of view capable of capturing the irradiation range of the long-distance irradiation lamp 105B.

The light multipliers 108A, 108B have gates 108Aa, 108Ba and image intensifiers 108Ab, 108Bb, respectively.

The gates 108Aa, 108Ba are opened and closed in response to an opening/closing command signal from the tinting controller 110. In the present embodiment, an opening time (gate time) tG of each gate 108Aa, 108B is set to 5 ns which is the same as the light emission time tL. The gate time tG is proportional to an imaging target length (imaging target depth) of each area (target distance area) in the entire captured area from an area 1 to an area n. As the gate time tG is lengthened, the imaging target length of each area is lengthened. The imaging target length is obtained from light speed×gate time tG. The imaging target length is obtained from light speed×gate time tG, and in the present embodiment, since the gate time tG=5 ns, the imaging target length is set to 1.5 m from "light speed (about $3\times10^8$ m(s)×gate time (5 ns)".

The image intensifiers 108Ab, 108Bb are devices for viewing an image with contrast by converting extremely weak light (reflected light from the object, or the like) into electron once, electrically amplifying it, and returning it to a fluorescent image again to multiply the amount of light. The light amplified by the image intensifiers 108Ab, 108Bb is guided to the image sensors 109A, 109B.

The image sensors 109A, 109B capture images generated from the light multipliers 108A, 108B in response to a command signal from the timing controller 110 and output the captured images to the image processing unit 103. In the present embodiment, for example, an image sensor with a resolution of 640×480 (horizontal: vertical), a luminance value of 1 to 255 (256 levels) and 100 fps or more is used.

The timing controller 110 controls imaging timing by setting a delay time tD ($tD_n$ and $tD_{n+1}$ in FIG. 4), which is the time from a light emission start time of the short-distance irradiation lamp 105A and the long-distance irradiation lamp 105B to the opening time of the gates 108Aa, 108Ba of the short-distance imaging camera 106A and the long-distance imaging camera 106B, such that the captured images captured by the image sensors 109A, 109B become the timing of the reflected light returning from a target distance area which is a target captured area, and outputting opening/closing command signal corresponding to the delay time tD. That is, the delay time tD is a value that determines a distance (imaging target distance) from the vehicle V to the target distance area. The relationship between the delay time tD and the imaging target distance is obtained from the following formula (1).

$$\text{Imaging target distance}=\text{light speed}(\text{about }3\times10^8 \text{ m/s})\times\text{delay time }tD/2 \quad \text{formula (1)}$$

The timing controller 110 changes the imaging range of the short-distance imaging camera 106A and the long-distance imaging camera 106B to the front side of the vehicle V by increasing the delay time tD by a predetermined interval (e.g., 10 ns) such that the target distance area continuously moves forward (far away) away from the vehicle V. Meanwhile, the timing controller 110 initiates an imaging operation of the short-distance imaging camera 106A and the long-distance imaging camera 106B immediately before the gates 108Aa, 108Ab are opened, and terminates the imaging operation after the gates 108Aa, 108Ab are completely closed.

The timing controller 110 controls the short-distance irradiation lamp 105A and the long-distance irradiation lamp 105B, and the gates 108Aa, 108Ba of the short-distance imaging camera 106A and the long-distance imaging camera 106B so as to perform light emission and exposure multiple times for each of predetermined target distance areas (each area of area 1, area 2, . . . , and area n) set in advance. The light received by each of the short-distance imaging camera 106A and the long-distance imaging camera 106B is converted into electric charge and accumulated by repeating light emission and exposure multiple times. One captured image obtained every predetermined electric charge accumulation time is called a frame. Meanwhile, the short-distance imaging camera 106A and the long-distance imaging camera 106B may acquire one captured image (one frame) for each target distance area or may acquire a plurality of captured images (several frames) for each target distance area. In this manner, the short-distance imaging camera 106A and the long-distance imaging camera 106B acquire a plurality of captured images having different target distance areas and output the plurality of captured images acquired to the image processing unit 103.

Based on the luminance of the same pixel in the captured image of the entire captured area captured by the short-distance imaging camera 106A and the long-distance imaging camera 106B, the image processing unit 103 generates distance image data representing a distance to an object (target) for each pixel and outputs the generated distance image data to the object recognition processing unit 104.

The object recognition processing unit 104 specifies an object included in the distance image data. A well-known technique such as pattern matching can be used as a method of specifying an object.

The determination unit 111 determines whether or not vehicle control such as information presentation to the driver due to alarm or the like and automatic braking is required, based on the relationship (distance, relative speed, etc.) between an object (person, cars, signs, etc.) specified by the object recognition processing unit 104 and a host vehicle.

Figure 5:
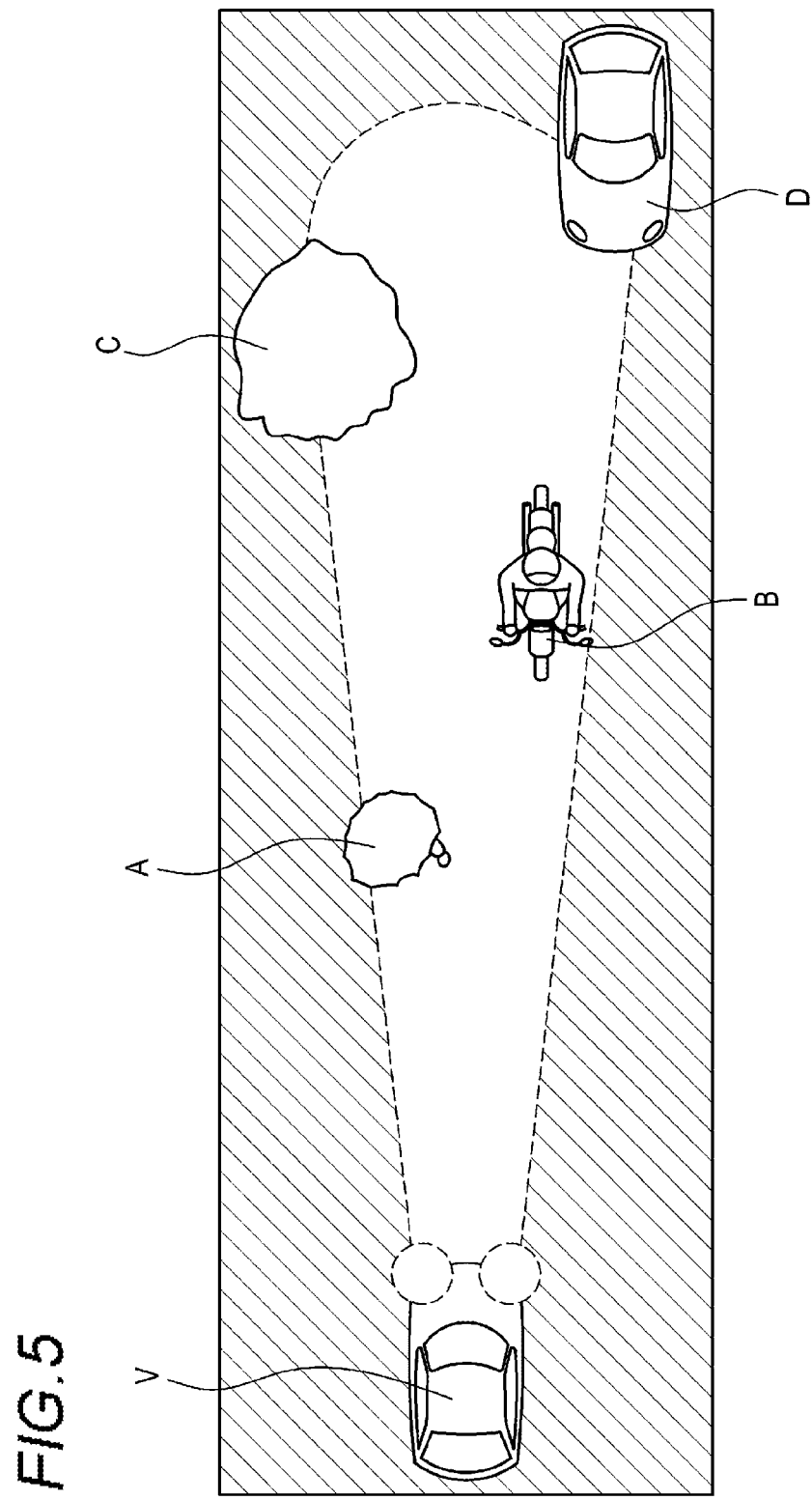
FIG. 5 is a view showing a situation where four different objects are present at different positions in front of a host vehicle.

FIG. 5 shows a situation where four objects A to D are present at different positions in front of the vehicle V The object A is a person holding an umbrella, the object B is a motorcycle on the opposite lane side, the object C is a tree on the sidewalk side, and the object D is a vehicle (oncoming vehicle) on the opposite lane side. The distance relationship between the vehicle V and each object is set to A<B<C<D.

FIG. 6 is a schematic view showing temporal luminance changes of pixels corresponding to each object.

As shown in FIG. 6, when the captured areas are partially overlapped, the luminance value of the same pixel in a plurality of continuous captured images represents a triangular waveform characteristic in which the luminance value gradually increases, reaches the peak at the position of each object A to D and then gradually decreases. In this manner, the temporal luminance change of the pixel represents a triangular waveform shape when the reflected light from one object is included in a plurality of captured images. Therefore, the captured areas corresponding to the peaks of the triangular waveform shape are set to the distances from the vehicle V to each object (subject) A to D in the pixels, so that the detection accuracy can be enhanced.

FIG. 7 is a view showing an image acquisition processing according to the second embodiment.

First, in process f, the timing controller 110 makes the long-distance irradiation lamp 105B emit light, and opens and closes the shutter (gate) of the long-distance imaging camera 106B after a reflection time $tD_2$ of the reflected light from a distant area (e.g., a predetermined distance area in an area of 100 m to 200 m) included in the irradiation range (the range equivalent to the irradiation range 20B in FIG. 2) of the long-distance irradiation lamp 105B has elapsed. In this process f, reflected light L2 from an object (e.g., pedestrian M2) distant from the vehicle V is received by the long-distance imaging camera 106B, whereas light L1 reflected by an object (e.g., pedestrian M1) in the vicinity of the vehicle V is not received because the light L1 passes through the long-distance imaging camera 106B when the shutter of the long-distance imaging camera 106B is opened.

Subsequently; in process f+1, the timing controller 110 makes the short-distance irradiation lamp 105A emit light, and opens and closes the shutter (gate) of the short-distance imaging camera 106A after a reflection time $tD_1$ of the reflected light from a near area (e.g., a predetermined distance area in an area of 0 m to 100 m) included in the irradiation range (the range equivalent to the irradiation range 20A in FIG. 2) of the short-distance irradiation lamp 105A has elapsed. In this process f+1, the reflected light L1 from the near pedestrian M1 is received by the short-distance imaging camera 106A, whereas the light L2 reflected by the distant pedestrian M2 is not received because the light L2 does not reach the short-distance imaging camera 106A when the shutter of the short-distance imaging camera 106A is opened.

Subsequently, in process f+2, the timing controller 110 makes the long-distance irradiation lamp 105B emit light again, and opens and closes the shutter (gate) of the long-distance imaging camera 106B after a reflection time $tD_{2+1}$ of the reflected light from the distant area has elapsed. Similar to the process f, in the process f+2, the reflected light L2 from the distant pedestrian M2 is received, whereas the reflected light L1 from the near pedestrian M1 is not received.

Subsequently, in process f+3 the timing controller 110 makes the short-distance irradiation lamp 105A emit light again, and opens and closes the shutter (gate) of the short-distance imaging camera 106A after a reflection time $tD_{1+1}$ of the reflected light from the near area has elapsed. Similar to the process f+1, in the process f+3, the reflected light L1 from the near pedestrian M1 is received, whereas the reflected light L2 from the distant pedestrian M2 is not received.

Similarly, in process f+4 to f+n, the timing controller 110 makes the long-distance imaging camera 106B and the short-distance imaging camera 106A, respectively, perform imaging at imaging timings of gradually increasing the reflection time $tD_2$ and $tD_1$ while sequentially switching the irradiation from the long-distance irradiation lamp 105B and the irradiation from the short-distance irradiation lamp 105A. Thus, the long-distance imaging camera 106B and the short-distance imaging camera 106A can exhaustively acquire captured images of the entire range of the target distance area. Meanwhile, the image processing unit 103 generates distance image data by combining the captured images of the entire range.

According to the image acquisition device 102 of the second embodiment described above, the following effects can be obtained.

(3) In the vehicle sensor (obstacle detection device) 101 of the second embodiment, each of the short-distance irradiation lamp 105A and the long-distance irradiation lamp 105B emits pulsed light in a predetermined direction, and each of the short-distance imaging camera 106A and the long-distance imaging camera 106B captures reflected light returning from the target distance area at an imaging timing set according to the target distance area, thereby acquiring captured images having different target distance area. Furthermore, the image acquisition device 102 includes the timing controller 110 for controlling the light emission period of the pulsed light emitted from the short-distance irradiation lamp 105A and the long-distance irradiation lamp 105B and the imaging timing of the short-distance imaging camera 106A and the long-distance imaging camera 106B. According to this configuration, it is possible to exhaustively acquire captured images over a wide range from a near place to a far place with a simple configuration.

(4) Preferably, the timing controller 110 controls the light emission period so that the light emission of the short-distance irradiation lamp 105A and the long-distance irradiation lamp 105B is sequentially switched, and the timing controller 110 controls the imaging timing so that the shutter of the short-distance imaging camera 106A is opened after the reflection time of reflected light of light emitted from the short-distance irradiation lamp 105A has elapsed and the shutter of the long-distance imaging camera 106B is opened after the reflection time of reflected light of light emitted from the long-distance irradiation lamp 105B has elapsed. According to this configuration, the light emission/exposure control can be independently performed in a short-distance optical system (the short-distance irradiation lamp 105A and the short-distance imaging camera 106A) and a long-distance optical system (the long-distance irradiation lamp 105B and the long-distance imaging camera 106B), respectively, so that it is possible to simplify the control process.

Meanwhile, the image acquisition processing according to the second embodiment is not limited to the example shown in FIG. 7. FIG. 8 is a view showing an image acquisition processing according to another example of the second embodiment.

As shown in FIG. 8, in each process f to f+n, the timing controller 110 may control the light emission period so that the short-distance irradiation lamp 105A and the long-distance irradiation lamp 105B emit light simultaneously, and the timing controller 110 may control the imaging timing so that the shutter of the short-distance imaging camera 106A is opened after the reflection time $tD_1$~$tD_{1+n}$ of reflected light of light emitted from the short-distance irradiation lamp 105A has elapsed and the shutter of the long-distance imaging camera 106B is opened after the reflection time $tD_2$~$tD_{2+n}$ of reflected light of light emitted from the long-distance irradiation lamp 105B has elapsed. According to this configuration, the captured images in a near place and a far place in front of the vehicle V can be acquired in a short time.

Although the embodiment for carrying out the disclosure has been described with reference to the examples, the specific configurations of the disclosure are not limited to the configurations of the examples. Design changes and addition and the like are permitted so long as they do not depart from the gist of the disclosure according to each claim of the claims.

For example, the imaging target length, the amount of change in the imaging target distance, and the number of frames for each target distance area, and the like can be suitably set according to the performance of the camera and the image processing unit.

In the above embodiments, the camera is configured to function as the image acquisition unit, but the disclosure is not limited to this example. For example, the image processing unit may function as the image acquisition unit. Alternatively, a separate memory as the image acquisition unit for storing the captured images may be provided between the camera and the image processing unit.

In the above embodiments, as shown in FIG. 7, the light multipliers 108A, 108B are provided between the objective lenses 107A, 107B and the cameras 106A, 106B, but the disclosure is not limited to this example. For example, it is also possible to acquire a plurality of captured images by performing gating at a predetermined imaging timing within the cameras 106A, 106B without providing the light multiplier.

In the above embodiments, the object recognition is performed by generating the distance image data by the image processing unit. However, the object recognition may be performed from the captured images of respective target distances captured by the camera.

The present application is based on Japanese Patent Application (Patent Application No. 2015-248824) filed on Dec. 21, 2015, the contents of which are incorporated herein as a reference.

What is claimed is:

1. A vehicle sensor comprising:
a first light source for short-distance irradiation of a first region and a first camera for short-distance imaging mounted on one of a pair of left and right headlamps provided in a vehicle; and
a second light source for long-distance irradiation of a second region and a second camera for long-distance imaging mounted on the other of the pair of left and right headlamps, wherein the first region and the second region overlap;
an object recognition processing unit configured to identify objects in image data captured by the first and second cameras; and
a light distribution control unit configured to control light distribution of low-beam and high-beam irradiation lamps mounted in the left and right headlamps dependent on the identified objects.

2. The vehicle sensor according to claim 1,
wherein an irradiation range in a left and right direction of the first light source is in a range of ±20° or more but 90° or less around an optical axis of the first light source, and
wherein an irradiation range in a left and right direction of the second light source is in a range of ±5° or more but 10° or less around an optical axis of the second light source.

3. The vehicle sensor according to claim 1,
wherein the first camera can capture an irradiation range of the first light source, whereas the second camera can capture an irradiation range of the second light source.

4. The vehicle sensor according to claim 1,
wherein each of the first light source and the second light source light emits pulsed light in a predetermined direction,
wherein each of the first camera and the second camera acquires a plurality of captured images having different target distance areas by capturing reflected light returning from a target distance area at an imaging timing set according to the target distance area, and
wherein the vehicle sensor further comprises a timing control unit configured to control the light emission period of the pulsed light emitted from the first light source and the second light source and the imaging timing of the first camera and the second camera.

5. The vehicle sensor according to claim 4,
wherein the timing control unit controls the light emission period so that the light emission of the first light source and the second light source is sequentially switched, and the timing control unit controls the imaging timing so that the shutter of the first camera is opened after the reflection time of reflected light of light emitted from the first light source has elapsed and the shutter of the second camera is opened after the reflection time of reflected light of light emitted from the second light source has elapsed.

6. The vehicle sensor according to claim 4, wherein the timing control unit controls the light emission period so that the first light source and the second light source emit light simultaneously, and the timing control unit controls the imaging timing so that the shutter of the first camera is opened after the reflection time of reflected light of light emitted from the first light source has elapsed and the shutter of the second camera is opened after the reflection time of reflected light of light emitted from the second light source has elapsed.

7. A vehicle comprising the vehicle sensor according to claim 1.

8. The vehicle sensor according to claim 1, wherein an irradiation range of the first light source and the irradiation range of the second light source are toward a front side of the vehicle only.

* * * * *